(12) United States Patent
Goossen (10) Patent No.: US 8,635,817 B2
(45) Date of Patent: Jan. 28, 2014

(54) REFLECTIVE ROOF

(75) Inventor: Keith Goossen, Howell, NJ (US)

(73) Assignee: Empire Technology Development LLC, Wilmington, DE (US)

( * ) Notice: Subject to any disclaimer, the term of this patent is extended or adjusted under 35 U.S.C. 154(b) by 5 days.

(21) Appl. No.: 13/260,157

(22) PCT Filed: Nov. 2, 2010

(86) PCT No.: PCT/US2010/055152
§ 371 (c)(1),
(2), (4) Date: Sep. 23, 2011

(87) PCT Pub. No.: WO2012/060823
PCT Pub. Date: May 10, 2012

(65) Prior Publication Data
US 2012/0222365 A1 Sep. 6, 2012

(51) Int. Cl.
*E04D 13/18* (2006.01)
*E04H 14/00* (2006.01)
*E04H 9/00* (2006.01)
*F24J 2/46* (2006.01)
*F24J 2/04* (2006.01)
*G02B 26/02* (2006.01)

(52) U.S. Cl.
USPC ............ 52/173.3; 52/1; 126/623; 126/640; 359/228

(58) Field of Classification Search
USPC ............ 52/173.3, 1; 126/623, 640; 359/228, 359/833
See application file for complete search history.

(56) References Cited

U.S. PATENT DOCUMENTS

| 4,167,934 A * | 9/1979 | Miles ........................ 126/586 |
| 2011/0047869 A1* | 3/2011 | Griessen et al. ............... 47/17 |
| 2012/0222365 A1* | 9/2012 | Goossen .......................... 52/1 |

FOREIGN PATENT DOCUMENTS

| EP | 0270910 A1 | 6/1988 |
| JP | 2007290917 A | 11/2007 |
| WO | 93/06421 A1 | 4/1993 |
| WO | WO 9306421 A1 * | 4/1993 ............... F24J 2/04 |
| WO | 2009099331 A2 | 8/2009 |

OTHER PUBLICATIONS

LiveScience Staff, Brilliant! Roof Tiles Change Color to Save Energy, Oct. 15, 2009, LiveScience, accessed online via http://www.livescience.com/5783-brilliant-roof-tiles-change-color-save-energy.html.
American Chemical Society, New 'smart' roof reads the thermometer, saves energy in hot and cold climates, Mar. 22, 2010, LabSpaces, accessed online via http://www.labspaces.net/102649/New_smart_roof_reads_the_thermometer_saves_energy_in_hot_and_cold_climates.
United States Patent and Trademark Office, International Search Report and Written Opinion of the International Searching Authority for PCT/US10/55152, prepared on May 5, 2011, USA.

* cited by examiner

*Primary Examiner* — Andrew Triggs
(74) *Attorney, Agent, or Firm* — Foley & Lardner LLP (57) ABSTRACT

Technologies and implementations for reflective roofs are generally disclosed.

10 Claims, 5 Drawing Sheets

600 A computer program product.

602 A signal bearing medium.

604 Machine-readable instructions, which, if executed by one or more processors, operatively enable a computing device to:

sense an environmental condition associated with a reflective roof system;

remove a first fluid from the reflective roof system based at least in part on the sensed environmental conditions, wherein the roof system has a first optical property when the first fluid is in fluid communication with a hollow inner compartment portion of the roof system; and/or     introduce a second fluid to the reflective roof system based at least in part on the sensed environmental conditions, wherein the roof system has a second optical property, which is different from the first optical property, when the second fluid is in fluid communication with the hollow inner compartment portion of the roof system.

| 606 a computer-readable medium. | 608 a recordable medium. | 610 a communications medium. |

REFLECTIVE ROOF

BACKGROUND

Unless otherwise indicated herein, the approaches described in this section are not prior art to the claims in this application and are not admitted to be prior art by inclusion in this section.

There have been attempts to make roofs change from white to black seasonally. Such attempts aim to provide roofs that may be reflective in the summer to lower cooling costs and non-reflective in the winter to lower heating costs. For example, in one such attempt, tiles may utilize a polymer similar to that used in hair gels and water, in a solution encapsulated between layers of flexible plastic. In this example, when cool, the polymer may stay dissolved, letting a black background show through. When warmed, the polymer may condense to form tiny droplets, whose small sizes scatter light and thus produce a white surface, reflecting the sun's heat.

SUMMARY

Some example apparatus related to roof structures may include a main body, where the main body may include an outer surface, a hollow inner compartment, and a light scattering structure. The outer surface may be configured to resist precipitation, and may be configured to pass light therethrough. The hollow inner compartment may be positioned adjacent the outer surface, and may be capable of removably storing fluid within the main body. The light scattering structure may be positioned in contact with the hollow inner compartment. The light scattering structure may be configured to scatter light when in fluid communication with a fluid having a disparate reflective index as compared with the light scattering structure, and may be configured to pass light therethrough when in fluid communication with a fluid having a similar reflective index as compared with the light scattering structure.

Some example systems related to reflective roofs may include a pump and a multiple number of roof structures. Individual roof structures may include a main body, where the main body may include an outer surface, a hollow inner compartment, and a light scattering structure. The outer surface may be configured to resist precipitation, and may be configured to pass light therethrough. The hollow inner compartment may be positioned adjacent the outer surface, and may be capable of removably storing fluid within the main body. The light scattering structure may be positioned in contact with the hollow inner compartment. The light scattering structure may be configured to scatter light when in fluid communication with a fluid having a disparate reflective index as compared with the light scattering structure, and may be configured to pass light therethrough when in fluid communication with a fluid having a similar reflective index as compared with the light scattering structure. The pump may be coupled in fluid communication with the multiple number of roof structures. The pump may be configured to exchange of the type of fluid associated with the light scattering structure.

Some example apparatus related to roof structures may include a main body, where the main body may include an outer surface, a back surface, and a hollow inner compartment. The outer surface may be configured to resist precipitation, and may be configured to pass light therethrough. The back surface may be positioned opposite the outer surface, and may be configured to reflect light. The hollow inner compartment may be positioned between the outer surface and the back surface, and may be capable of removably storing fluid within the main body. The roof structure may be configured to reflect light when the hollow inner compartment is in fluid communication with a clear fluid, and may be configured to absorb light when the hollow inner compartment is in fluid communication with an opaque fluid.

Some example methods related to control of reflective roof systems may include sensing an environmental condition associated with a reflective roof system. A first fluid may be removed from the reflective roof system based at least in part on the sensed environmental conditions, where the roof system may have a first optical property when the first fluid is in fluid communication with a hollow inner compartment portion of the roof system. A second fluid may be introduced to the reflective roof system based at least in part on the sensed environmental conditions, where the roof system may have a second optical property, which is different from the first optical property, when the second fluid is in fluid communication with the hollow inner compartment portion of the roof system.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to implementing reflective roofs.

As noted above, there have been attempts to make roofs change from white to black seasonally. Such attempts aim to provide roofs that may be reflective in the summer to lower cooling costs and non-reflective in the winter to lower heating costs. As will be discussed in greater detail below, reflective roof structures that are configured to exchange fluid may alternate between being reflective and being non-reflective.

Figure 1:
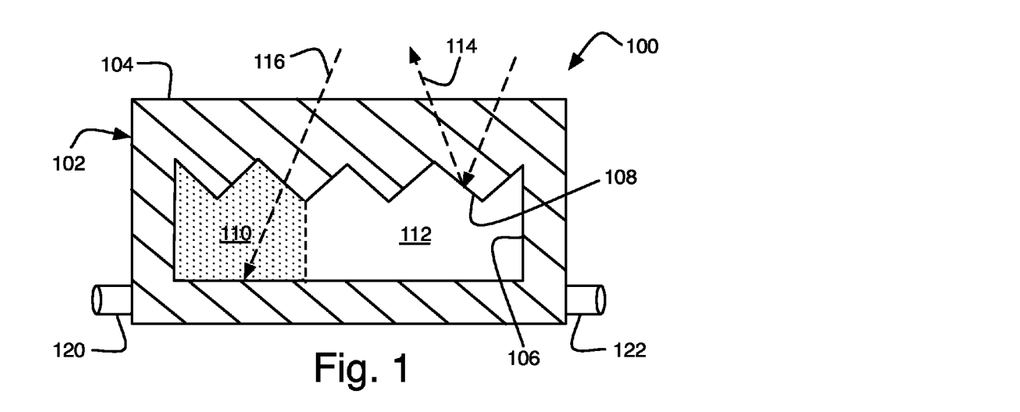
FIG. 1 is an illustration of an example cross-sectional view of a reflective roof structure.

FIG. 1 is an illustration of an example cross-sectional view of a reflective roof structure that is arranged in accordance with at least some embodiments of the present disclosure. In the illustrated example, a roof structure 100 may include a main body 102. Main body 102 may include an outer surface 104, a hollow inner compartment 106, and a light scattering structure 108.

Outer surface 104 may be configured to resist precipitation, such as rain, hail, and/or snow, for example. Outer surface 104 may be configured to pass light therethrough. In some examples, roof structure 100 may be oriented and arranged to operate as a sky-light-type roof structure, a shingle-type roof structure, a flat roof structure, the like, and/or combinations thereof.

Hollow inner compartment 106 may be positioned adjacent outer surface 104. Hollow inner compartment 106 may be capable of removably storing fluid within main body 102, as illustrated by first fluid 110 and second fluid 112. In the illustrated example, roof structure 100 is shown in two states. In the first state, hollow inner compartment 106 is illustrated as removably storing first fluid 110 within main body 102. In the second state, hollow inner compartment 106 is illustrated as removably storing second fluid 112 within main body 102.

Light scattering structure 108 may be positioned in contact with hollow inner compartment 106. In the illustrated example, light scattering structure 108 may include a corrugated surface positioned between outer surface 104 and hollow inner compartment 106. Such a corrugated surface may have approximately a forty-five degree angle or the like, depending on the desired reflectiveness. In such an example, light scattering structure 108 may form a portion of hollow inner compartment 106.

Light scattering structure 108 may be configured to scatter light 114 when in fluid communication with a fluid (e.g., second fluid 112) having a disparate reflective index as compared with light scattering structure 108. Additionally or alternatively, light scattering structure 108 may be configured to pass light 116 therethrough when in fluid communication with a fluid (e.g., first fluid 110) having a similar reflective index as compared with light scattering structure 108.

A fluid having a similar reflective index (e.g., first fluid 110) as compared with light scattering structure 108 may include one or more of the following substances: water, ethylene glycol, mineral oil (or other oils, such as vegetable oil, glycerin, or the like), the like, and/or combinations thereof, for example. Additionally or alternatively, fluid having a similar reflective index (e.g., first fluid 110) as compared with light scattering structure 108 may include toluene, benzene, the like, and/or combinations thereof. For example, such a fluid might include a base component (e.g., water, mineral oil, or the like), an anti-freezing agent (e.g., ethylene glycol or the like), and/or an anti-algae agent (e.g., chlorine, herbicides, or the like).

The similarity of reflective index may be dependent on the material utilized for light scattering structure 108 as well as the substances utilized for first fluid 110. For example, light scattering structure 108 (as well as outer surface 104 and/or main body 102) may be composed of poly(methyl methacrylate) (e.g., Plexiglas™), acrylic, optical plastics, polycarbonate, polystyrene, other plastic types, other glass types, the like, and/or combinations thereof. In an example utilizing acrylic, an acrylic light scattering structure 108 might have a refractive index of about 1.49, while a water based fluid might have a refractive index of about 1.33, an ethylene glycol based fluid might have a refractive index of about 1.43, a mineral oil based fluid might a refractive index of about 1.49. The more similar the reflective index between first fluid 110 as compared with light scattering structure 108, the more light 116 that will pass through light scattering structure 108.

As used herein the term "similar reflective index" may refer to index matching between a fluid 110 and a light scattering structure sufficient to render the light scattering structure more transparent than reflecting. For example, light scattering structure 108 may utilize total internal reflection in the reflecting state, where total-internal reflection occurs due to Snell's Law when the product of the refractive index and sin (theta) is greater than 1. In an example with a plastic structure with a refractive index of about 1.5, a corrugated angle of forty-two degrees or higher may be reflective. When first fluid 110 is added, the total-internal reflection of light scattering structure 108 may be eliminated or reduced, and the structure may become primarily non-reflecting. For example, assuming first fluid 110 composed primarily of water, whose refractive index is about 1.33, the total-internal reflection angle may be changed to greater than sixty degrees, and nearly all rays of light 116 may be transmitted.

A fluid having a disparate reflective index (e.g., second fluid 112) as compared with light scattering structure 108 may include air, for example. In an example utilizing acrylic, an acrylic light scattering structure 108 might have a refractive index of about 1.49, while an air based fluid might have a refractive index of about 1.0. The more disparate the reflective index between second fluid 112 as compared with light scattering structure 108, the more light 114 that will be scattered via light scattering structure 108. As used herein the term "disparate reflective index" may refer to index matching between a fluid 110 and a light scattering structure sufficient to render the light scattering structure more reflecting than transparent.

Roof structure 100 may also include a fluid inlet 120 and a fluid outlet 122. Fluid inlet 120 and fluid outlet 122 each may be coupled in fluid communication with hollow inner compartment 106. Accordingly, hollow inner compartment 106 may be capable of removably storing fluid within main body 102 via the fluid inlet 120 and fluid outlet 122.

Figure 2:
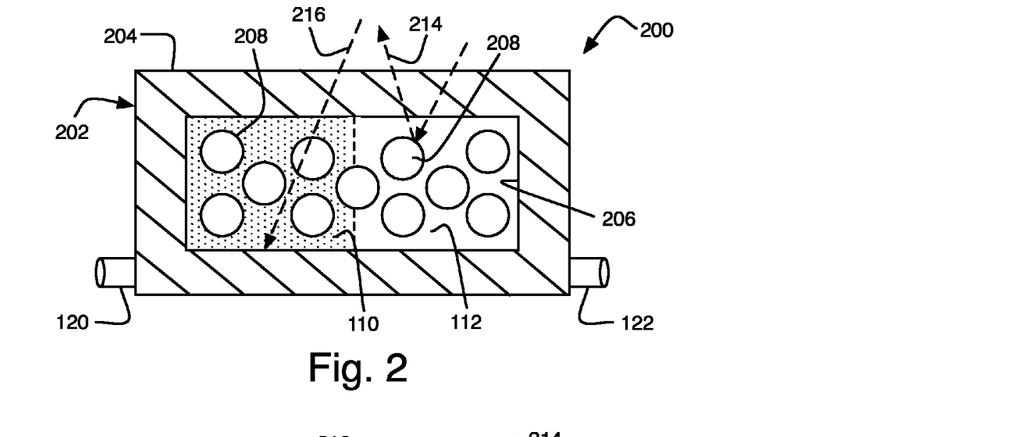
FIG. 2 is an illustration of an example cross-sectional view of a further reflective roof structure.

FIG. 2 is an illustration of an example cross-sectional view of a further reflective roof structure that is arranged in accordance with at least some embodiments of the present disclosure. In the illustrated example, a roof structure 200 may include a main body 202. Main body 202 may include an outer surface 204, a hollow inner compartment 206, and a light scattering structure 208.

Roof structure 200 may share some similarities with roof structure 100. For example, outer surface 204 may be configured to resist precipitation, such as rain, hail, and/or snow, for example. Outer surface 204 may be configured to pass light therethrough. In some examples, roof structure 200 may be oriented and arranged to operate as a sky-light-type roof structure, a shingle-type roof structure, the like, and/or combinations thereof. Additionally, hollow inner compartment 206 may be positioned adjacent outer surface 204. Hollow inner compartment 206 may be capable of removably storing fluid within main body 202, as illustrated by first fluid 110 and second fluid 112.

Light scattering structure 208 may be positioned to be located within hollow inner compartment 206. Accordingly, as shown in FIG. 2, the light scattering structure 208 is encompassed within the hollow inner compartment 206. In the illustrated example, light scattering structure 208 may include a multiple number of clear beads. In such an example, light scattering structure 208 may include a multiple number of clear beads, which may include one or more of the following shapes sphere-shaped beads, faceted-shaped beads (e.g., square, hexagonal, etc.), snow-shaped beads, the like, and/or combinations thereof. In the illustrated example, light scattering structure 208, outer surface 204 and main body 202 may be composed of the same or different materials. For example light scattering structure 208, outer surface 204 and main body 202 may be composed of poly(methyl methacrylate) (e.g., Plexiglas™), acrylic, optical plastics, polycarbonate, polystyrene, other plastic types, other glass types, the like, and/or combinations thereof.

In the illustrated example, sphere-shaped beads may provide a structure with a wider acceptance angle for total-internal reflection, as compared with the light scattering structure 108 of FIG. 1. Such sphere-shaped beads may normally reflect light 214, but when surrounded by first fluid 110 may become nearly invisible due to index-matching. Such sphere-shaped beads may also be referred to as "cat's-eye" retroreflectors. Since the sphere-shaped beads reflect in any direction there is no angular dependence. Differently shaped objects than sphere-shaped beads may also be effective since it is not required that retro-reflection occur, just that a portion of the rays of light 214 are reflected from a building employing roof structure 200. For example, even high purity sand could be used as a light scattering structure 208.

Light scattering structure 208 (and roof structure 200) may be thin, on the order of millimeters, so the weight loading on the roof is minimal. For example, only a very thin layer of sand spread upon a black surface may become highly reflecting; similarly, a light scattering structure 208 may be effective at a thickness of only a few millimeters.

In some examples, light scattering structure 208 could be unitary, that is, not a collection of objects but rather a complex porous structure. For example, light scattering structure 208 might be a complex porous structure that resembles snow structurally and optically.

Light scattering structure 208 may be configured to scatter light 214 when in fluid communication with a fluid (e.g., second fluid 112) having a disparate reflective index as compared with light scattering structure 208. Additionally or alternatively, light scattering structure 208 may be configured to pass light 216 therethrough when in fluid communication with a fluid (e.g., first fluid 110) having a similar reflective index as compared with light scattering structure 208.

In operation, in the summer light scattering structure 208 might increase reflection, reducing heat load. When filled with first fluid 110 in the winter, the reflection would drop dramatically, providing heat load and offsetting heating costs.

Figure 3:
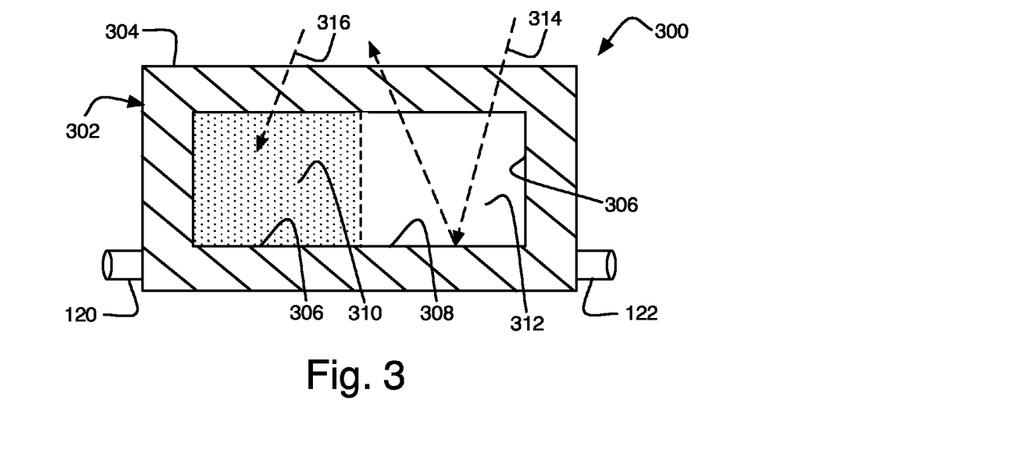
FIG. 3 is an illustration of an example cross-sectional view of a still further reflective roof structure.

FIG. 3 is an illustration of an example cross-sectional view of a still further reflective roof structure that is arranged in accordance with at least some embodiments of the present disclosure. In the illustrated example, a roof structure 300 may include a main body 302. Main body 302 may include an outer surface 304, a hollow inner compartment 306, and a back surface 308.

Roof structure 300 may share some similarities with roof structure 100. For example, outer surface 304 may be configured to resist precipitation, such as rain, hail, and/or snow, for example. Outer surface 304 may be configured to pass light therethrough. In some examples, roof structure 300 may be oriented and arranged to operate as a sky-light-type roof structure, a shingle-type roof structure, the like, and/or combinations thereof. Additionally, hollow inner compartment 306 may be positioned adjacent outer surface 304. Hollow inner compartment 306 may be capable of removably storing fluid within main body 302, as illustrated by first fluid 110 and second fluid 112.

Back surface 308 may be positioned opposite outer surface 304, and may be configured to reflect light. For example, back surface 308 may include a white coloration, a silver coloration, the like, and/or combinations thereof. Hollow inner compartment 306 may be positioned between outer surface 304 and back surface 308.

In operation, roof structure 300 may be configured to reflect light 314 when hollow inner compartment 306 is in fluid communication with a clear fluid 312 (e.g., air, water based fluid, mineral oil based fluid, etc.), and may be configured to absorb light when hollow inner compartment 306 is in fluid communication with an opaque fluid 310. For example, opaque fluid 310 may include a darkening agent, such as a black coloration or the like. In other respects, opaque fluid 310 and clear fluid 312 may be of similar composition to either fluid 110 or 112, as was discussed above with respect to FIG. 1.

Figure 4:
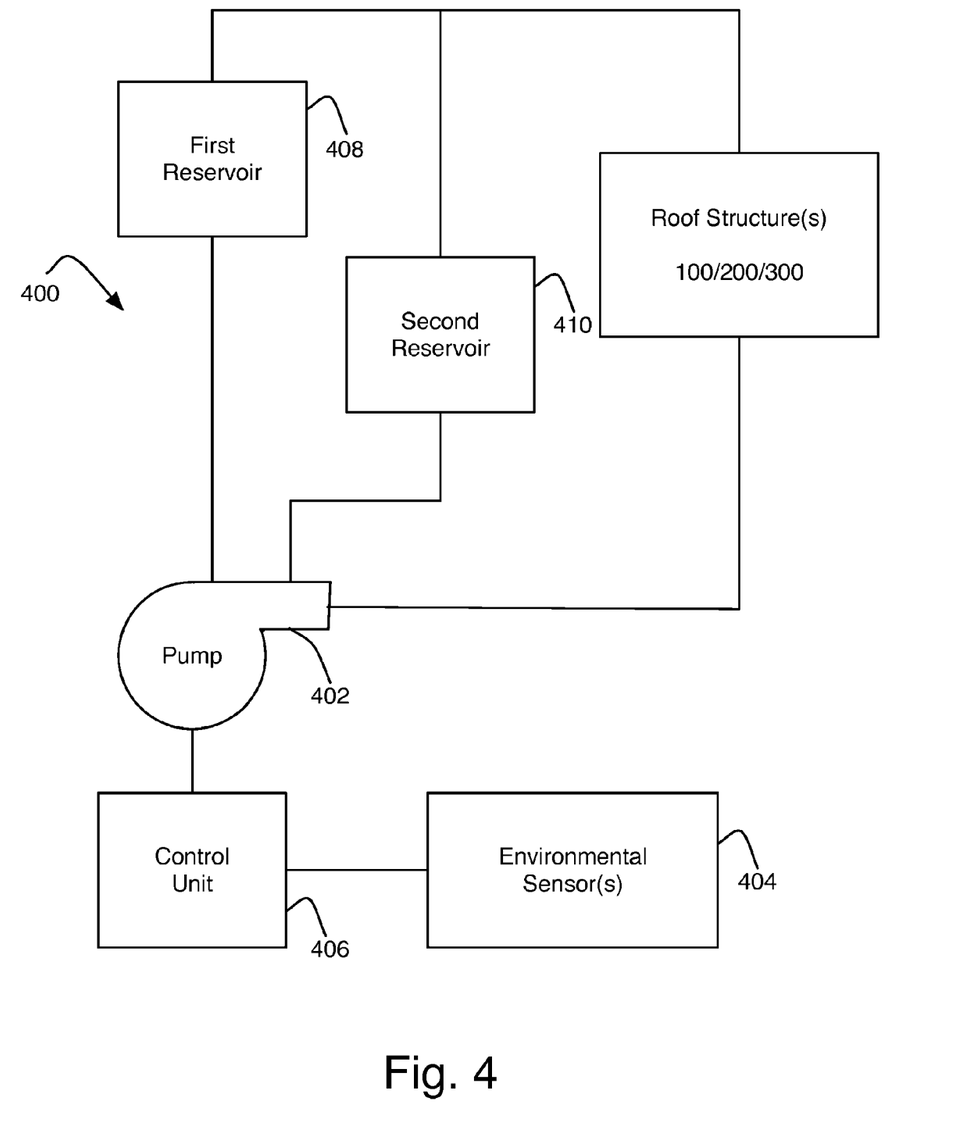
FIG. 4 is an illustration of an example reflective roof system including a reflective roof structure.

FIG. 4 is an illustration of an example reflective roof system including a reflective roof structure that is arranged in accordance with at least some embodiments of the present disclosure. In the illustrated example, reflective roof system 400 may include a multiple number of roof structures, such as multiple roof structures 100, multiple roof structures 200, multiple roof structures 300, or a combination thereof. Reflective roof system 400 may also include a pump 402, one or more environmental sensors 404, a control unit 406, a first reservoir 408, and/or a second reservoir 410.

Such reflective roof systems 400 may be utilized in commercial buildings, industrial buildings, residential buildings, or the like. For example, a roof may be covered in the multiple number of roof structures 100/200/300 (which could be in the form of shingles, for example) that may be reflective in one state and non-reflective in another state. Such a change in reflectivity state may be adjusted by exchanging the type of fluid in the multiple number of roof structures 100/200/300.

Pump 402 may be coupled in fluid communication with the multiple number of roof structures 100/200/300. Pump 402 may be configured to exchange the type of fluid associated with the light scattering structure of roof structures 100/200/300. In such an example, roof structures 100/200/300 may be associated with one another in series, parallel, or some combination thereof.

One or more environmental sensors 404 may be configured to sense one or more environmental conditions. For example, the one or more environmental sensors 404 may include one or more of the following sensors: light-type sensors, outdoor temperature-type sensors, indoor temperature-type sensors, humidity sensors, the like, and/or combinations thereof.

Control unit 406 may be operatively associated with the one or more environmental sensors 404 to receive information from these sensors. Control unit 406 may be configured to direct the exchange of the type of fluid associated with the light scattering structure of roof structures 100/200/300 based at least in part on the sensed environmental conditions.

In some embodiments one or more reservoirs, such as first reservoir 408 and/or a second reservoir 410 may be utilized to store various types of fluids associated with the light scattering structure of roof structures 100/200/300. In examples where air is utilized as a fluid, a reservoir may or may not be utilized. In the illustrated example, first reservoir 408 may be coupled in fluid communication with pump 402. First reservoir 408 may be configured to store a first fluid having a similar reflective index. Likewise, second reservoir 410 may be coupled in fluid communication with pump 402. Second reservoir 410 also may be configured to store a second fluid having a similar reflective index. However, the first fluid may have a reflective index different from the second fluid.

In operation, reflective roof system 400 may operate by selecting between the first fluid, the second fluid, and/or ambient air. Such a selection may be based at least in part on the sensed environmental conditions. For example, control unit 406 may be configured to direct the exchange of the type of fluid associated with the light scattering structure of roof structures 100/200/300, wherein the type of fluid may include a fluid having a disparate reflective index (e.g., ambient air), a first fluid having a similar reflective index (e.g., a fluid stored in first reservoir 408), and a second fluid having a similar reflective index (e.g., a fluid stored in second reservoir 410).

Figure 5:
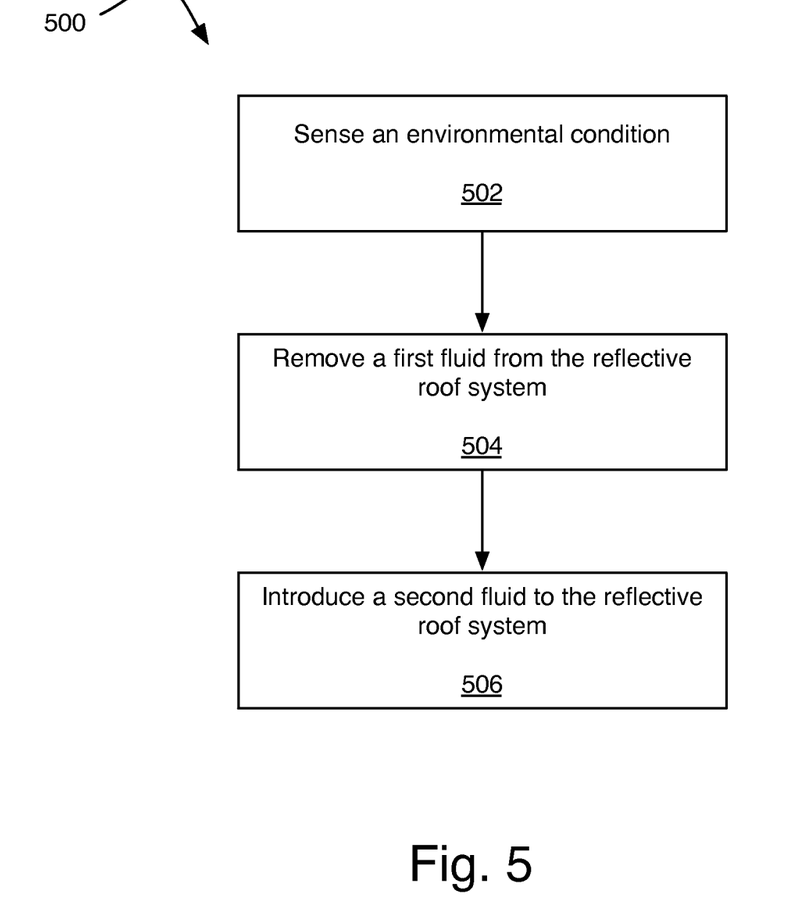
FIG. 5 is an illustration of an example process for operation of a reflective roof system.

FIG. 5 is an illustration of an example process for operation of a reflective roof system that is arranged in accordance with at least some embodiments of the present disclosure. In the illustrated example, process 500, and other processes described herein, set forth various functional blocks or actions that may be described as processing steps, functional operations, events and/or acts, etc., which may be performed by hardware, software, and/or firmware. Those skilled in the art in light of the present disclosure will recognize that numerous alternatives to the functional blocks shown in FIG. 5 may be practiced in various implementations. For example, although process 500, as shown in FIG. 5, comprises one particular order of blocks or actions, the order in which these blocks or actions are presented does not necessarily limit claimed subject matter to any particular order. Likewise, intervening actions not shown in FIG. 5 and/or additional actions not shown in FIG. 5 may be employed and/or some of the actions shown in FIG. 5 may be eliminated, without departing from the scope of claimed subject matter. Process 500 may include one or more of operations as illustrated by blocks 502, 504, and/or 506.

As illustrated, process 500 may be implemented for response to environmental conditions during operation of a reflective roof system. Processing may begin at operation 502, "sense an environmental condition", where an environmental condition may be sensed. For example, environmental conditions associated with a reflective roof system may be sensed via one or more environmental sensors. Such environmental sensors may monitor light-type environmental conditions, outdoor temperature-type environmental conditions, indoor temperature-type environmental conditions, the like, and/or a combination thereof.

Processing may continue from operation 502 to operation 504, "remove a first fluid from the reflective roof system", where a first fluid may be removed from the reflective roof system. For example, a first fluid may be removed from the reflective roof system based at least in part on the sensed environmental conditions. In such an example, the reflective roof system may have a first optical property when the first fluid is in fluid communication with a hollow inner compartment portion of the reflective roof system.

Processing may continue from operation 504 to operation 506, "introduce a second fluid to the reflective roof system", where a second fluid may be introduced to the reflective roof system. For example, a second fluid may be introduced to the reflective roof system based at least in part on the sensed environmental conditions. In such an example, the reflective roof system may have a second optical property, which is different from the first optical property, when the second fluid is in fluid communication with the hollow inner compartment portion of the reflective roof system.

Figure 6:
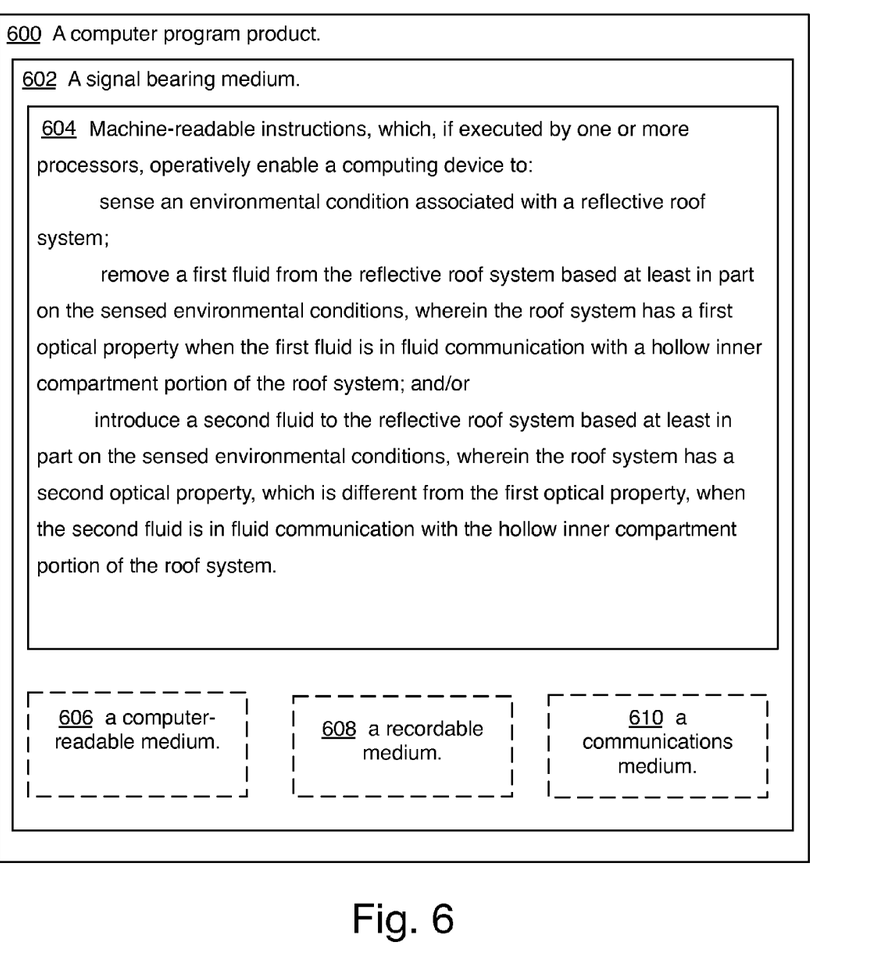
FIG. 6 is an illustration of an example computer program product.

FIG. 6 illustrates an example computer program product 600 that is arranged in accordance with at least some embodiments of the present disclosure. Computer program product 600 may include a signal bearing medium 602. Signal bearing medium 602 may include one or more machine-readable instructions 604, which, when executed by one or more processors, may operatively enable a computing device to provide the functionality described above with respect to FIG. 5. Thus, for example, referring to the system of FIG. 5, reflective roof system 400 may undertake one or more of the actions shown in FIG. 5 in response to instructions 604 conveyed by medium 602.

In some implementations, signal bearing medium 602 may encompass a computer-readable medium 606, such as, but not limited to, a hard disk drive, a Compact Disc (CD), a Digital Video Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communication link, a wireless communication link, etc.).

Figure 7:
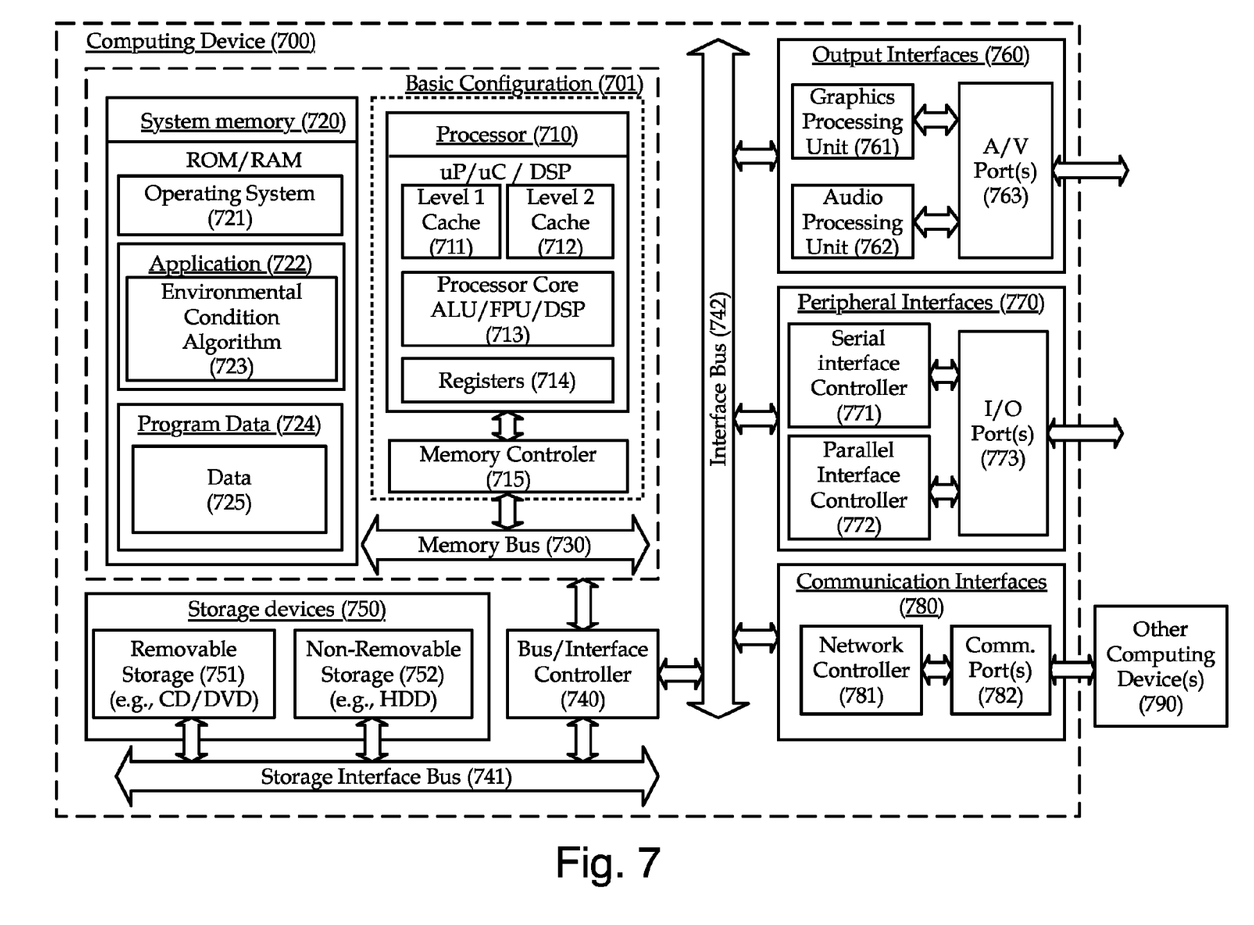
FIG. 7 is a block diagram illustrating an example computing device; all arranged in accordance with at least some embodiments of the present disclosure.

FIG. 7 is a block diagram illustrating an example computing device 700 that is arranged in accordance with at least some embodiments of the present disclosure. In one example basic configuration 701, computing device 700 may include one or more processors 710 and system memory 720. A memory bus 730 can be used for communicating between the processor 710 and the system memory 720.

Depending on the desired configuration, processor 710 may be of any type including but not limited to a microprocessor (µP), a microcontroller (µC), a digital signal processor (DSP), or any combination thereof. Processor 710 can include one or more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Depending on the desired configuration, the system memory 720 may be of any type including but not limited to volatile memory (such as RAM), non-volatile memory (such as ROM, flash memory, etc.) or any combination thereof. System memory 720 may include an operating system 721, one or more applications 722, and program data 724. Application 722 may include environmental condition algorithm 723 that can be arranged to perform the functions, actions, and/or operations as described herein including the functional blocks, actions, and/or operations described with respect to process 500 of FIG. 5. Program Data 724 may include data 725 for use with the environmental condition algorithm 723. In some example embodiments, application 722 may be arranged to operate with program data 724 on an operating system 721 such that implementations of response to environmental conditions during operation of a reflective roof structure may be provided as described herein. This described basic configuration is illustrated in FIG. 7 by those components within dashed line 701.

Computing device 700 may have additional features or functionality, and additional interfaces to facilitate communications between the basic configuration 701 and any required devices and interfaces. For example, a bus/interface controller 740 may be used to facilitate communications between the basic configuration 701 and one or more data storage devices 750 via a storage interface bus 741. The data storage devices 750 may be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of device 700.

Computing device 700 may also include an interface bus 742 for facilitating communication from various interface devices (e.g., output interfaces, peripheral interfaces, and communication interfaces) to the basic configuration 701 via the bus/interface controller 740. Example output interfaces 760 may include a graphics processing unit 761 and an audio processing unit 762, which may be configured to communicate to various external devices such as a display or speakers via one or more A/V ports 763. Example peripheral interfaces 770 may include a serial interface controller 771 or a parallel interface controller 772, which may be configured to communicate with external devices such as input devices (e.g., keyboard, mouse, pen, voice input device, touch input device, etc.) or other peripheral devices (e.g., printer, scanner, etc.) via one or more I/O ports 773. An example communication interface 780 includes a network controller 781, which may be arranged to facilitate communications with one or more other computing devices 790 over a network communication via one or more communication ports 782. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 700 may also be implemented as a personal computer including both laptop computer and non-laptop computer configurations. In addition, computing device 700 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A reflective roof system, comprising:
   a plurality of roof structures, each of the plurality of roof structures comprising:
   an outer surface, wherein the outer surface is precipitation resistant, and wherein the outer surface is configured to pass light therethrough;
   a hollow inner compartment positioned adjacent to the outer surface, wherein the hollow inner compartment stores a fluid; and
   a plurality of light scattering structures encompassed within the hollow inner compartment and having a reflective index, wherein the plurality of light scattering structures are surrounded by the fluid stored within the hollow inner compartment and are configured to scatter light or pass light therethrough based upon the fluid stored within the hollow inner compartment, wherein the plurality of light scattering structures are configured to scatter light when the fluid has a disparate reflective index as compared with the plurality of light scattering structures, and wherein the plurality of light scattering structures are configured to pass light therethrough when the fluid has a similar reflective index as compared with the plurality of light scattering structures;

a first reservoir configured to store a first fluid having a reflective index similar to the reflective index of the plurality of light scattering structures;

a pump coupled in fluid communication with the hollow inner compartment of each of the plurality of roof structures and the first reservoir, wherein the pump is configured to:

exchange the first fluid in the hollow inner compartment with a second fluid having a reflective index disparate to the reflective index of the plurality of light scattering structures; and exchange the second fluid in the hollow inner compartment with the first fluid; and one or more environmental sensors configured to sense one or more environmental conditions; and a control unit operatively associated with the one or more environmental sensors and configured to control the pump to exchange the first fluid or exchange the second fluid based on the sensed one or more environmental conditions.

2. The reflective roof system of claim 1, wherein the one or more environmental sensors include one or more of the following sensors: light-type sensors, humidity sensors, outdoor temperature-type sensors, and indoor temperature-type sensors.

3. The reflective roof system of claim 1, wherein the second fluid comprises air.

4. The reflective roof system of claim 1, wherein the plurality of light scattering structures comprise a plurality of clear beads.

5. The reflective roof system of claim 4, wherein the plurality of clear beads include one or more beads of the following shapes: sphere-shaped beads, faceted-shaped beads, and snow-shaped beads.

6. The reflective roof system of claim 4, wherein the plurality of clear beads have the same reflective index as the first fluid, and wherein the plurality of clear beads are configured to be substantially invisible when surrounded by the first fluid.

7. The reflective roof system of claim 1, further comprising:

a second reservoir configured to store the second fluid and coupled in fluid communication with the pump.

8. The reflective roof system of claim 1, wherein at least one of the roof structures comprises a skylight-type roof structure.

9. The reflective roof system of claim 1, wherein at least one of the roof structures comprises a shingle-type roof structure.

10. The reflective roof system of claim 1, wherein the first fluid includes one or more of the following substances: water, ethylene glycol, and mineral oil.

* * * * *

UNITED STATES PATENT AND TRADEMARK OFFICE
CERTIFICATE OF CORRECTION

| | | |
|---|---|---|
| PATENT NO. | : 8,635,817 B2 | Page 1 of 1 |
| APPLICATION NO. | : 13/260157 | |
| DATED | : January 28, 2014 | |
| INVENTOR(S) | : Goossen | |

It is certified that error appears in the above-identified patent and that said Letters Patent is hereby corrected as shown below:

On the Title Page, Item (56), under "FOREIGN PATENT DOCUMENTS", in Column 2, Line 3, delete "WO 93/06421 A1 4/1993".

In the Drawings

In Fig. 7, Sheet 5 of 5, in Box "(715)", Line 1, delete "Memory Controler" and insert -- Memory Controller --, therefor.

In the Specification

In Column 11, Line 6, delete "and or" and insert -- and/or --, therefor.

Signed and Sealed this
Second Day of September, 2014

Michelle K. Lee
*Deputy Director of the United States Patent and Trademark Office*